March 9, 1971          K. PREECE          3,568,309

METHOD OF MANUFACTURING DYNAMO ELECTRIC MACHINES

Original Filed July 24, 1967

March 9, 1971 K. PREECE 3,568,309

METHOD OF MANUFACTURING DYNAMO ELECTRIC MACHINES

Original Filed July 24, 1967 3 Sheets-Sheet 2

United States Patent Office 3,568,309
Patented Mar. 9, 1971

3,568,309
METHOD OF MANUFACTURING DYNAMO ELECTRIC MACHINES
Kenneth Preece, Solihull, England, assignor to Joseph Lucas (Industries) Limited, Birmingham, England
Original application July 24, 1967, Ser. No. 655,493. Divided and this application Feb. 25, 1969, Ser. No. 816,861
Int. Cl. H01r 43/00
U.S. Cl. 29—597                    2 Claims

ABSTRACT OF THE DISCLOSURE

A dynamo electric machine including a rotor and a commutator rotatable with the rotor, the ends of the windings of the rotor being connected to the conductive segments of the commutator, and constituting part of each of the faces of the conductive segments of the commutator on which the brushes of the machine run in use.

This is a divisional of application Ser. No. 655,493, filed July 24, 1967, now abandoned.

This invention relates to a method of manufacturing dynamo electric machines and is particularly but not exclusively directed to starter motors for use in road vehicles.

A dynamo electric machine according to the invention includes a rotor, a commutator mounted on the rotor shaft, and windings carried by the rotor, the ends of said windings forming part of each of the faces of the conductive segments of the commutator on which the brushes run in use.

One embodiment of the invention is illustrated in the accompanying drawings wherein.

Figure 1:
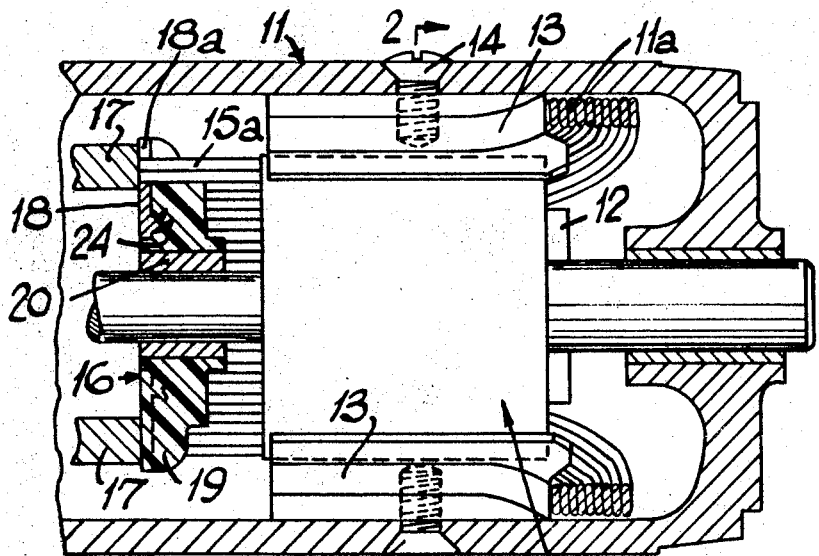
FIG. 1 is a sectional view of a dynamo electric machine.
Figure 2:
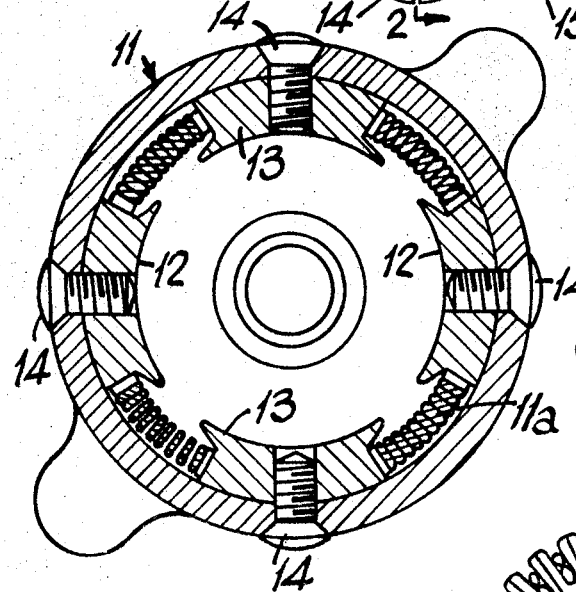
FIG. 2 is a sectional view on the line 2—2 in FIG. 1 but with the rotor removed.
Figure 3:
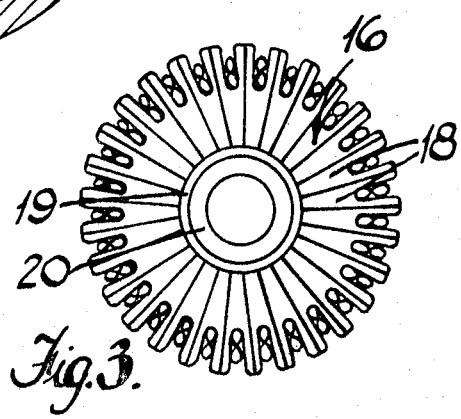
FIG. 3 is a plan view of the commutator in FIG. 1, FIGS. 4, 5, 6, 7 and 8 are perspective views of a commutator during consecutive states in its manufacture by a first method and, FIGS. 9 to 14 are views similar to FIGS. 4 to 8 of a commutator during consecutive stages in its manufacture by a second method.
Figure 4:
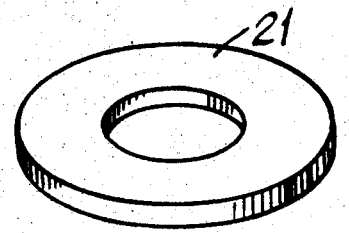

Referring first to FIGS. 1 to 3, the dynamo electric machine includes a stator comprising a cylindrical yoke 11 having therein two pairs of diametrically opposite poles 12, 13 secured to the yoke by screws 14.

The poles 12, 13 are each formed with one flat end and one rounded end, the rounded ends of adjacent poles being disposed at opposite ends of the yoke 11. The poles 12, 13 serve to secure the field winding 11a of the machine in position, the winding 11a including substantially axially extending portions which engage the sides of the poles and which are interconnected by further portions which extend round the rounded ends of the poles. Rotatable within the yoke 11 is a rotor 15, and secured to the rotor shaft is a face commutator 16. The commutator in use, is engaged by brushes 17 carried by the end plate (not shown) of the machine and through which the rotor windings are energised.

The commutator 16 (FIGS. 1 and 3) comprises a plurality of copper segments 18 supported on, and insulated from each other by an insulating moulding 19, the moulding 19 having an axially extending sleeve 20 therein which in use is an interference fit with the armature shaft. Each of the segments 18 is formed with a slot 18a which extends radially of the commutator. During construction of the armature the commutator 16 is engaged with the armature shaft and the ends 15a of the armature windings are engaged in the slots 18a and secured therein by soldering. The face of the commutator is then machined so that in use a plain face will be presented to the brushes 17. It will be appreciated that the brushes slide over the solder and the ends of the windings, which effectively become parts of the segments.

Figure 5:
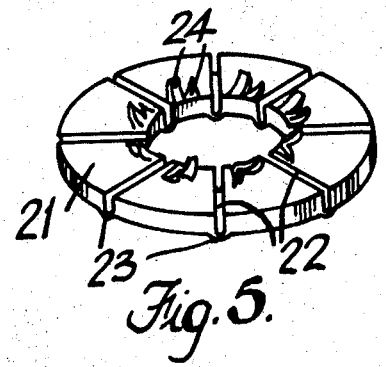
Figure 6:
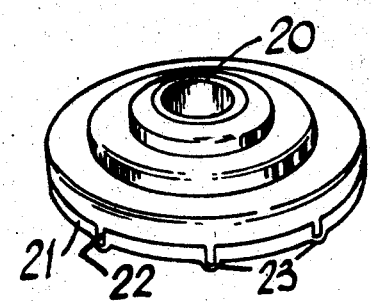
Figure 7:
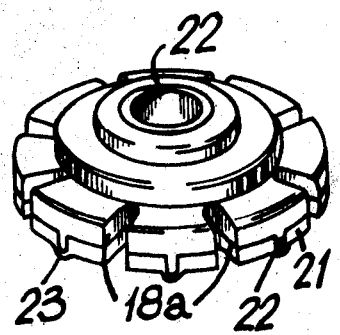
Figure 8:
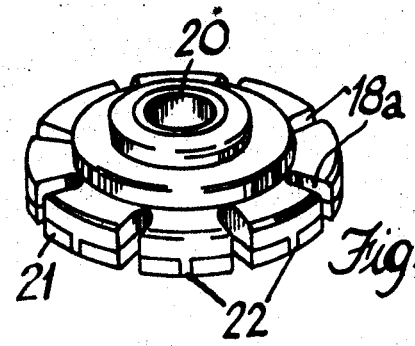
Figure 9:
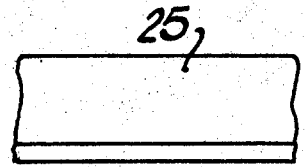

Referring now to FIGS. 4 to 8, in manufacturing the commutator as shown in FIG. 3 an annular copper disc 21 (FIG. 4) is divided into a plurality of segments by stamping therein a plurality of radial grooves 22 (FIG. 5). The grooves 22 extend through the thickness of the disc, the material displaced from these grooves forming ribs 23 on the underside of the disc. Each segment is then formed with a pair of lugs 24 which project from the upper face thereof. The disc is then placed in a mould with the sleeve 20, and a synthetic resin body is moulded onto it (FIG. 6), the lugs 24 acting as anchorages for the body. The synthetic resin fills the grooves 22, and insulates the disc 21 from the sleeve 20.

Each segment is then formed with a short radial slot 18a (FIG. 7) and the assembly is then machined to remove the ribs 23 (FIG. 8) thereby separating the segments from one another, each segment being insulated from its neighbour by the synthetic resin which occupied the respective groove 22.

Figure 10:
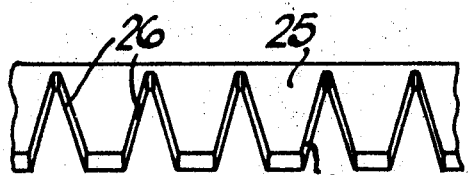
Figure 11:
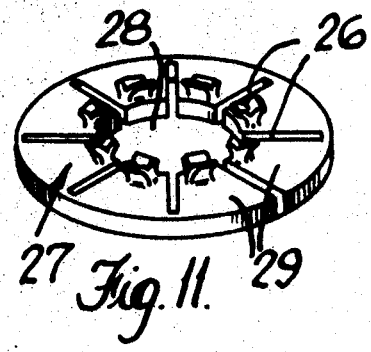

In an alternative manufacturing process (FIGS. 9 to 14) a copper strip 25 is formed with laterally disposed V-shaped slots 26 (FIG. 10), the open end of the V breaking one edge of the strip and the apex of the V being close to the other edge. The strip is then bent to form an annular disc (FIG. 11) the V-shaped slots 26 becoming closed until the edges of each slot are approximately parallel. This produces an annular disc 27 having a plurality of narrow radial slots, open to the central hole 28 of the disc 27 and extending almost to the peripheral edge of the disc, and defining between them a plurality of segments 29 joined at their periphery.

Figure 12:
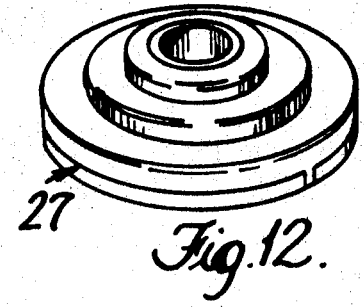
Figure 13:
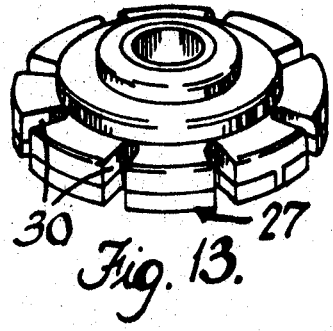
Figure 14:
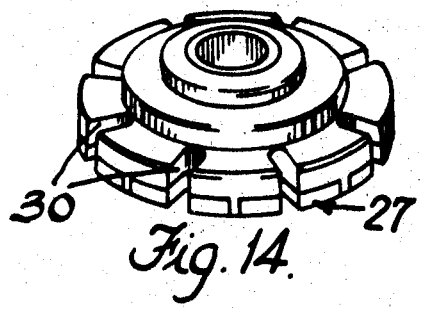

The disc is then moulded as described in the previous example (FIG. 12). Each segment 29 is then formed with a short radial slot 30 (FIG. 13) and the assembly is machined to remove the periphery of the disc and thereby isolate each segment from its neighbour (FIG. 14).

Having thus described my invention what I claim as new and desire to secure by Letters Patent is:

1. A method of manufacturing a dynamo electric machine including the steps of forming a conductive strip having a plurality of equispaced, laterally extending, V-shaped slots therein, the wider open ends of the slots being at one edge of the strip, bending the strip to form an annular disc, the edges of each of said V-shaped slots being moved towards one another as a result of said bending so that the slots then constitute generally parallel sided slots extending radially of the disc, moulding an insulating body on one face of the disc so that insulating material fills said parallel sided slots, forming each of the conductive segments defined between pairs of adjacent parallel sided slots with a generally radially extending slot, machining the periphery of the assembly so formed to separate the conductive segments from one another, engaging the face commutator so formed with the rotor shaft of the dynamo electric machine, soldering the ends of the rotor windings in the slots in the respective conductive segments of the commutator, and then machining the conductive segments of the commutator to render the ends of the windings flush with the surface of the segments so that the ends of the windings constitute parts of the surface on which the brushes of the dynamo electric machine run in use.

2. A method as claimed in claim 1 including the step of raising lugs on said one face of each of the conductive segments prior to the step of moulding the insulating body on said one face of the disc, so that the lugs form a key between the insulating body and each of the conductive segments.

References Cited
UNITED STATES PATENTS

| | | | |
|---|---|---|---|
| 2,451,500 | 10/1948 | Le Greid | 29—597 |
| 2,790,101 | 4/1957 | Clagett | 310—234 |
| 3,421,212 | 1/1969 | Chabot | 310—234X |
| 3,487,249 | 12/1969 | Nicholls et al. | 310—237X |

JOHN F. CAMPBELL, Primary Examiner

C. E. HALL, Assistant Examiner

U.S. Cl. X.R.

310—234, 237